(12) United States Patent
Roth (10) Patent No.: US 10,899,559 B2
(45) Date of Patent: Jan. 26, 2021

(54) DEVICE AND METHOD FOR RELIABLE DELIVERY OF COMPLIANT STOPPER ELEMENTS

(71) Applicant: SIDEL ENGINEERING & CONVEYING SOLUTIONS, Reichstett (FR)

(72) Inventor: Emmanuel Roth, Reichstett (FR)

(73) Assignee: SIDEL ENGINEERING & CONVEYING SOLUTIONS, Reichstett (FR)

( * ) Notice: Subject to any disclaimer, the term of this patent is extended or adjusted under 35 U.S.C. 154(b) by 0 days.

(21) Appl. No.: 15/914,704

(22) Filed: Mar. 7, 2018

(65) Prior Publication Data

US 2019/0276247 A1 Sep. 12, 2019

(30) Foreign Application Priority Data

Mar. 8, 2017 (FR) ...................................... 17 51863

(51) Int. Cl.
| | |
|---|---|
| *B65G 47/88* | (2006.01) |
| *B65G 47/08* | (2006.01) |
| *B65G 47/64* | (2006.01) |
| *B65G 47/42* | (2006.01) |
| *B65G 47/24* | (2006.01) |

(52) U.S. Cl.
CPC ......... *B65G 47/8853* (2013.01); *B65G 47/08* (2013.01); *B65G 47/24* (2013.01); *B65G 47/42* (2013.01); *B65G 47/64* (2013.01)

(58) Field of Classification Search
CPC .. B65G 47/08; B65G 47/855; B65G 47/8853; B65G 47/42; B65G 47/64

USPC ..................... 198/459.1, 459.2, 459.3, 459.4
See application file for complete search history.

(56) References Cited

U.S. PATENT DOCUMENTS

| | | | |
|---|---|---|---|
| 2,756,862 A | 7/1956 | Creed | |
| 3,193,078 A * | 7/1965 | Amenta | ................ B65G 47/71 |
| | | | 198/419.1 |
| 3,587,920 A * | 6/1971 | Avery, Jr. | ............. B65G 47/256 |
| | | | 221/171 |
| 4,741,428 A * | 5/1988 | Taniguchi | ................ B07C 5/02 |
| | | | 111/77 |
| 5,394,972 A | 3/1995 | Aidlin et al. | |

(Continued)

FOREIGN PATENT DOCUMENTS

| | | |
|---|---|---|
| CN | 1529165 A | 9/2004 |
| DE | 10 2012 216 163 A1 | 7/2013 |

(Continued)

OTHER PUBLICATIONS

FR Search Report, dated Nov. 23, 2017, from corresponding FR application No. 1751863.

*Primary Examiner* — Gene O Crawford
*Assistant Examiner* — Lester Rushin, III (57) ABSTRACT

Device for delivery of sorted elements for feeding a downstream work station that includes a downward drop that brings the elements, a one-at-a-time processor that receives the elements from the drop, an upward conveyor branch that extends from the processor and that receives the elements therefrom, and an ejector that is located in the area of the upward conveyor branch. The device includes at least one viewing unit that is positioned to monitor the elements in the area of the processor, such as a camera.

20 Claims, 4 Drawing Sheets

(56) References Cited

U.S. PATENT DOCUMENTS

| | | | |
|---|---|---|---|
| 5,586,637 A | 12/1996 | Aidlin et al. | |
| 7,222,719 B2 * | 5/2007 | Shackelford | B65G 47/1457 198/443 |
| 7,850,403 B2 | 12/2010 | Lorange et al. | |
| 9,139,378 B2 | 9/2015 | Lopez et al. | |
| 2017/0362038 A1 | 12/2017 | Roth | |

FOREIGN PATENT DOCUMENTS

| | | |
|---|---|---|
| EP | 2 588 395 A2 | 5/2013 |
| JP | 2010/101691 A | 5/2010 |
| WO | 2006/045927 A1 | 5/2006 |
| WO | 2016/107656 A1 | 7/2016 |

* cited by examiner

DEVICE AND METHOD FOR RELIABLE DELIVERY OF COMPLIANT STOPPER ELEMENTS

BACKGROUND OF THE INVENTION

Field of the Invention

This invention pertains to the field of the delivery of stopper elements for liquid containers, such as bottles, flasks, etc., and it has as its object, on the one hand, a device that makes it possible to convey compliant elements in a selective way, and, on the other hand, a method that uses this device.

Description of the Related Art

In the field of the invention, the delivery of stopper elements is necessary upstream from a machine that has as its essential function to fill the container and to close it.

The delivery of the stopper elements is preferably done with a first sorting device as described in, for example, WO2006/045927 and that comprises a hopper, into which a large quantity of stopper elements can be poured in loose form, as well as a lifting belt, traveling upward from the hopper to sample elements therein and to bring them into the area of an upper exit zone. The belt generally has transverse strips on which the stopper elements rest as they are conveyed upward.

As they travel on the belt among the hopper, supply zone, and exit zone, the poorly-oriented elements are ejected, preferably simply by making them drop from the belt to the hopper by gravity, as is described in, for example, U.S. Pat. Nos. 5,394,972 or 5,586,637. This thus makes it possible generally to ensure that the stopper elements that are delivered by this first sorting device all have their bottoms right side up.

Thus, EP2588395 discloses a sorting wheel that is located downstream from the travel device described in the preceding paragraph that detaches poorly-positioned caps using a principle of retractable pins that can, depending on the orientation thereof, hook the cap and guide it or not. It is also possible to use such a wheel for distinguishing the caps based on the possible absence of a collar. The conveying of this wheel downstream is done with two belts that entrain the stopper elements without referencing them and that therefore convey them in loose form.

WO2016/107656 discloses, for example, a means for analysis of a stopper element, located in the area of a lifting conveyor that monitors a poor orientation, a dimension, and if the stopper element is complete. This means of analysis is coupled to an ejection means that is located downstream and that ejects the stopper elements that are considered to be non-compliant.

SUMMARY OF THE INVENTION

It is therefore necessary to propose a solution that makes it possible, and this even at high speed, to detect, downstream from an orientation device, stopper elements that would be non-compliant, in particular in terms of orientation, or that offers a shortest distance between a viewing means and an ejection means so as to have a lower and therefore more ergonomic lifting conveyor for the user and a faster response time between the monitoring of the stopper element and ejection.

To do this, the invention proposes monitoring the stopper elements that are positioned in the area of the processing means by at least one viewing means.

For this purpose, the invention has as its object a device for delivery of sorted elements, such as caps, stoppers, rings, or the like, to feed a downstream work station, with said device comprising a gravity drop that delivers the elements, a one-at-a-time processing means that receives the elements from the drop, an upward conveyor branch that extends from the processing means, and an ejection means that is located in the area of the upward conveyor branch.

This device is characterized in that it comprises at least one viewing means that is positioned to monitor the elements in the area of the processing means.

The invention also has as its object a method that uses such a device, namely a method for delivery of sorted elements, such as caps, stoppers, rings, or the like, to feed a downstream work station, comprising a series of steps that consist essentially in bringing the elements in a single-line column toward a processing means in the form of a downward drop, then, conveying and rounding up the elements in the processing means, then, lifting the elements in an upward conveyor branch.

This method is characterized in that it also comprises a step for analysis of elements by at least one viewing means in the area of the processing means.

BRIEF DESCRIPTION OF THE DRAWINGS

The invention will be better understood owing to the description below, which is based on possible embodiments, explained in a way that is illustrative and not at all limiting, with reference to the accompanying figures, in which.

DESCRIPTION OF THE PREFERRED EMBODIMENTS

The invention thus first has as its object a device 1 for delivery of sorted elements 2, such as caps, rings, stoppers, or the like, for feeding a downstream work station, with said device comprising a downward drop 3 that delivers the elements, a one-at-a-time processing means 4 that receives the elements from the drop, an upward conveyor branch 5 that extends from the processing means, and an ejection means 6 that is located in the area of the upward conveyor branch.

It should be noted here that the elements 2 can in particular be stoppers or caps that then have a shape that is complementary to a cylindrical spout of a container such as a flask or bottle. The stopper element consists of a surface opposite which there is an opening and a wall that makes up the section, in such a way that they have a U-shaped cross-section to take on the shape of the spout to which they are affixed. The element 2 then has an at least local symmetry around an axis of symmetry, which generally corresponds to the threaded shaft that is used to attach the element 2 to the container.

The first function of this delivery device 1 is therefore to feed a work station, such as a filling machine or a sealing device, with closing elements 2, such as caps, stoppers, or the like. The sorted elements mean that they are oriented one behind another and that they all have sufficient inherent qualities to allow them to be used to stopper a container.

Upstream from the downward drop 3, an installation for delivery of elements comprises a means for orientation of elements that brings the elements into a predefined position and therefore carries out an operation for selection of only the well-oriented elements 2.

In preferred embodiments, the orientation means can take on the shape of a belt that is equipped with transverse strips, on which the elements 2 can be positioned, i.e., the surface of the element is in contact with the bottom of the strip. The poorly-oriented elements 2 fall into the hopper that is located in the lower part of the installation, or the orientation means can also take on the shape of a centrifuge bowl (not shown). This centrifuge bowl comprises a cylindrical chamber that is fed at its center by elements 2 in loose form. This cylindrical chamber is mounted to rotate in relation to its axis of revolution so as to transfer the elements toward an outlet by centrifugal force.

The oriented elements 2 pass through the downward drop 3 that is oriented essentially downward. The elements go down into this drop by gravity. Upstream from the processing means 4, an accumulation of elements 2 is thus possible within the downward drop 3, which makes it possible to ensure a constant supply to the processing means 4 owing to suitable regulation.

Downstream from the drop 3, the elements enter into the top part of the processing means 4. The processing means processes each element 2 separately and individually, whereas upstream, they are freely in loose form, against one another within a single-line column that extends vertically within the downward drop 3.

The processing means 4 thus makes it possible to bring about referencing of the elements 2 individually, as well as to define a precise referencing position, with their position being unknown precisely up until then. The processing means 4 can ensure an orientation of the elements, and even an ejection of the non-compliant elements. The processing means 4 makes it possible at least to grasp each element separately and to deliver them to an upward conveyor branch 5 just afterward. Being located at the low part of the device, the processing means 4 is easily accessible for an intervention in the event of a problem.

Then, following the processing means, the elements 2 are picked up by the upward conveyor branch 5 that comprises an endless belt to which are attached wedges 12 that exert a thrust on the section of the elements to lift them, a pad on which the surface of the elements slides and a wall opposite to the pad, so as to prevent any jostling of the element, as well as a guide 13 that is opposite to the upward conveyor branch 5.

The structure of the upward conveyor belt 5 makes it possible to transport the elements individually and to maintain the orientation of the elements so as to be able to be exploited by a downstream work station or by an ejection means.

An ejection means 6 is preferably arranged in the area of the conveyor belt and downstream from a monitoring means so that the monitoring means can control the ejection means to eject the monitored elements as non-compliant.

In preferred embodiments, the ejection means 6 takes the form of a guide stop that modifies the path of the element 2 or that entrains the element 2, or else a compressed-air-jet nozzle, or else a mechanical device, such as a cylinder, for pushing the non-compliant element.

According to the invention, the delivery device 1 comprises at least one viewing means that is positioned to monitor the elements in the area of the processing means 4.

The viewing means 7 monitors the appearance of elements 2, whereas they are transported by the processing means 4, and, on the other hand, they are ejected by at least one ejection means 6, acting downstream from the viewing means 7, for ejecting the detected elements 2 as being non-compliant on the basis of a visual monitoring. The visual monitoring that is carried out by the viewing means 7 makes it possible to verify the final conformity of the elements 2 that are provided to the downstream work station by the delivery device 1, in terms of position, orientation, and/or inherent characteristics.

By inherent characteristics, it is necessary to understand in particular the dimensions of the element, such as its diameter. In addition, within the framework of stoppers, the visual monitoring makes it possible to verify the presence or absence of a tamper-proof ring or else a partial detachment of material or the presence or absence of a logo on the surface of the element.

This viewing means 7 comprises a camera or a photographic device that is equipped with a lens that is rotated toward the element that is to be monitored, a control unit that monitors the digitized image and interprets it.

It should be noted here that an axis of the viewing means 7, in particular a camera, corresponds to the direction in which the camera is located to take a picture.

This viewing means 7 can operate in various ways: either the viewing means monitors the element at a precise referencing position, i.e., when the element 2 is at a precise point in the processing means, or the viewing means monitors the element in a segment of its movement when it travels in the processing means, and in this case, the viewing means first searches for the stopper element on a part of the segment that is produced by the element in the processing means, and then the element is monitored.

According to a possible additional characteristic, the device 1 for delivery of elements comprises a viewing means 6 that is located facing the means of processing so as to monitor one of the surfaces of the element. In other words, the viewing means is positioned opposite the processing means, i.e., the axis of the viewing means, which corresponds to the direction in which said viewing means is located to take a picture, is parallel to the axis of symmetry of the element 2, which corresponds generally to the shaft that is used to attach the element 2 to the container, such as, for example, the threaded shaft.

Consequently, the axis of the viewing means can be placed on one side or the other of the processing means so as to be able to monitor the surface or the opening of the element 2 according to the positioning of the axis.

According to a possible additional characteristic, the device 1 for delivery of elements comprises a viewing means 7 that is located on one side of the processing means in such a way as to monitor a part of the section of the element, i.e., the axis of the viewing means that corresponds to the direction in which said viewing means is located to take a picture is to be perpendicular to the axis of symmetry of the element 2, which generally corresponds to the threaded shaft that is used to attach the element 2 to the container.

Consequently, the axis of the viewing means can be placed on the side of the processing means, for example to verify that in the case of the stoppers, a tamper-proof ring is present or absent. If the tamper-roof ring is absent, the stopper is ejected.

According to a possible additional characteristic, the operation of the viewing means 7 is synchronized with the operation of the processing means.

The delivery device 1 comprises a control unit that triggers the viewing means 7 based on a signal that represents the advance of the processing means 4.

In addition, the control unit triggers the actuation of the ejection means 6, in such a way as to implement the ejection means 6 in the event of the detection of a defect by the viewing means 7, and, as indicated, in a synchronized way with the movement of the processing means for ejecting the non-compliant elements.

According to a possible additional characteristic, the processing means comprises a referencing wheel 8 that delivers the elements one at a time to the upward conveyor branch 5.

The processing means 4 comprises a referencing wheel 8 on the periphery of which are located surfaces 10 that are essentially radial and able to convey the stopper elements 2 individually, with an outside guide 11 being located in the extension of one of the guides of the gravity drop 3 and parallel to the referencing wheel 8 so as to retain the elements, to reference them between the surface 10 and the guide 11, with a sliding pad being located in the extension of the pad of the gravity drop 3 that makes it possible for the element to slide at the top as it travels, and with a wall being located opposite and parallel to the sliding pad so as to prevent the elements 2 from jostling as they move.

The surfaces 10 are spaced from one another by a distance that is compatible with the processing that is carried out subsequently, i.e., monitoring of the quality of the stopper element, feeding of the downstream work station such as a sealing device, element-sterilizing station.

This referencing wheel makes it possible to rein in the elements, i.e., to put a precise distance between each element. In addition, the referencing wheel coupled to a coder makes it possible to know the precise position of the elements, which is used for triggering the viewing means 7 and/or actuation of the ejection means or for any other operations where the precise position of the element is to be known.

According to a possible additional characteristic, the processing means 4 comprises a referencing wheel 8 that delivers the elements one at a time to a return wheel 9, and the referencing wheel 8 and the return wheel 9 are equipped with referencing surfaces 10 that exert a thrust on the element to rein it in and to move it.

The processing means comprises a referencing wheel 8, but still in the processing means 4, the elements 2 are picked up by a return wheel 9. The former rotates clockwise in contrast to the referencing wheel that rotates counterclockwise. In a general way, they are contra-rotating elements.

The return wheel 9 has a structure that is similar to the referencing wheel 8, i.e., on its periphery, the return wheel 9 comprises surfaces 10 that are essentially radial and able to convey the elements 2 individually, with an outside guide 14 being located in the extension of the guides 11 and parallel to the circumference of the return wheel 9 so as to retain the elements, to reference them between the surface 10 and the guide 14, with a sliding pad being located in the extension of the pad of the referencing wheel making it possible for the element to slide at the top as it travels, and with a wall being located opposite and parallel to the sliding pad so as to prevent the elements 2 from jostling as they move.

The return wheel 9 makes it possible, in addition to the advantages given previously for the referencing wheel 8, to increase the transfer time between the drop 3 and the upward conveyor branch 5, and therefore to optimize the monitoring of the element and/or the ejection. This arrangement also makes it possible, if necessary, to carry out a second monitoring by positioning a second viewing means between the drop and the upward conveyor branch.

As a variant, the return wheel 9 can be a wheel that is used to engage a belt that is equipped with pins between which an element 2 is located each time. These pins comprise a surface that has the same function as the surface 10 of the embodiment described previously, i.e., said surface is able to convey the elements 2 individually.

According to a possible additional characteristic, the processing means 4 comprises a referencing wheel 8 that delivers the elements with a belt mounted on the return wheel 9; the belt and the referencing wheel are equipped with referencing surfaces 10 that exert a thrust on the element to rein it in and to move it.

The invention also has as its object a method for delivery of sorted elements 2, such as caps, stoppers, or the like, to feed a downstream work station, comprising a series of steps that consist essentially in bringing the elements in a single-line column toward a processing means in the form of a downward drop, then, conveying and rounding up the elements in a processing means, then, lifting the elements one at a time in an upward conveyor branch 5.

The method for delivery of elements 2 also comprises a step for monitoring the elements by at least one viewing means 6 in the area of the processing means 4.

According to a possible characteristic, the step for monitoring the element is carried out by a viewing means 6 that is synchronized with the movement of the stopper element 2 in the processing means 4.

According to a possible additional characteristic, the method also comprises a step for ejection of the element based on the monitoring step; said ejection step is implemented in the area of the upward conveyor branch 5.

Thanks to the one-at-a-time processing and the associated referencing of the elements 2, only—and reliably—the element that is detected as defective, or multiple elements behind or ahead of it, is/are ejected.

According to a possible additional characteristic, the method comprises a monitoring step that is carried out with the viewing means 6 that is located facing the processing means so as to monitor one surface of the stopper element 2.

According to a possible additional characteristic, the method comprises a monitoring step that is carried out with the viewing means 7 that is located on one side of the processing means 4 so as to monitor a part of the section of the element 2.

The invention will now be explained with reference to the illustrated embodiments.

Figure 1:
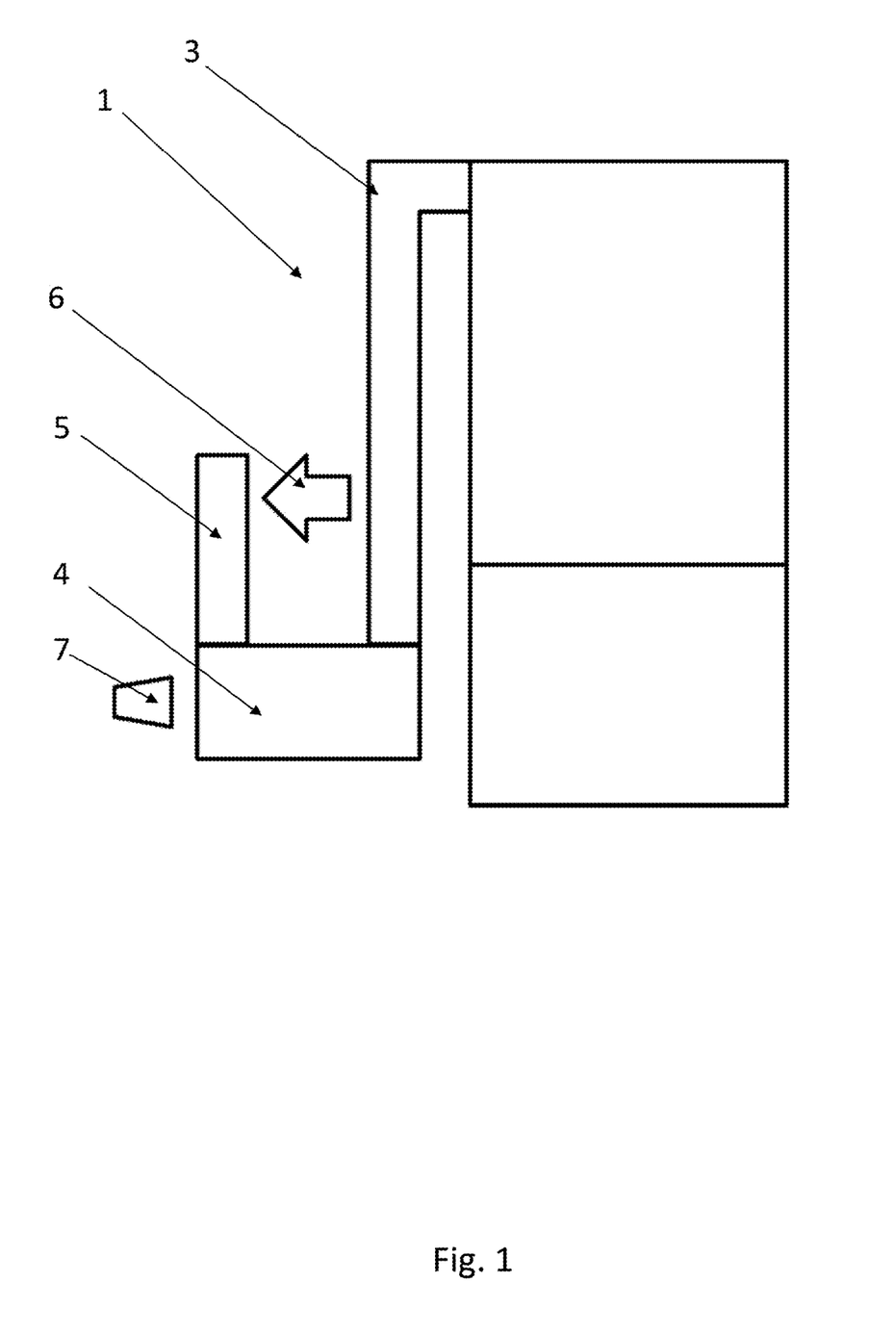
FIG. 1 is an overall view of an installation for delivery of stopper elements.

FIG. 1 illustrates in particular an overall view of an installation for delivery of stopper elements that comprise three modules.

The first module is a module for storing stopper elements 2 that comprises a hopper that is located in the low part of the delivery installation. This hopper consists of a chamber in which the stopper elements are poured in loose form. This chamber defines a volume of stopper elements making it possible in particular to define the autonomy of this delivery device. A low part of this chamber provides access to the second module.

In a first embodiment that is illustrated in FIG. 1, the second module is a sorting module that comprises an essentially vertical conveyor that makes it possible to lift the stopper elements from the low part, i.e., from the hopper, to a top part of the installation. This conveyor consists of an endless belt that comprises strips placed horizontally and personalized to the stopper element that is to be transported and sorted. These strips most often have a U-shaped cross-section, i.e., they consist of a bottom and two side walls. These strips dip into the hopper where the elements are located in loose form, to sample them and lift them into the top part of the installation.

The stopper element consists of a surface opposite which are located an opening and a wall that make up the section, in such a way that they have a U-shaped cross-section to take on the shape of the spout to which it is affixed.

These stopper elements are picked up by the strips for which there is only one single good orientation, i.e., the surface of the stopper element is in contact with the bottom of the strip whereas the poorly-oriented elements fall back into the hopper. To enhance this element orientation operation, a bump is located at a certain height of the vertical conveyor. The difference in weight between the opening and the surface is used to jostle and therefore sort the elements as they pass over the bump, more specifically by dropping the elements whose surface does not rest against the bottom of the strip. When the sorted elements reach the top of the second module, these sorted elements are ejected in line form either by a compressed air device or a mechanical system that consists of a pin that can be moved in the direction of the length of the strip. This pin passes between the strips and pushes the line of elements outside of the second module. At the end of the ejection, these lines of sorted stopper elements are sent on toward a third module.

In a variant of the second module, not shown, it is possible to use a centrifuge bowl to carry out the sorting of the stopper elements.

The third module is a device for delivery of elements comprising a gravity drop 3 that empties into a one-at-a-time processing means 4 of the stopper elements where a viewing means monitors them. Then, they are picked up by an upward conveyor branch 5 again to be lifted in the direction of a downstream work station. During this lifting, the stopper elements that are identified as non-compliant are ejected by an ejection means 6.

Downstream from the second module, the lines of sorted stopper elements are directed toward the processing means 4 by the gravity drop 3 that is essentially oriented downward. It consists of guides that can maintain the orientation of the stopper elements.

It should be noted that upon exiting from the second module, the lines of sorted stopper elements exit intermittently or sequentially because the strips are emptied one following the other whereas the work station that is located downstream, such as a sealing device or a sterilization device, operates continuously. So as to remedy this problem, downstream from the drop 3, and upstream from the processing means 4, the stopper elements are accumulated thus to form a continuous stream of stopper elements that are all oriented.

By being transferred into the processing means, the stopper elements undergo a processing, i.e., they are rounded up in relation to one another. In other words, they are conveyed with a distance in relation to one another and are monitored by at least one viewing means 7.

This viewing means can operate in various ways: either the viewing means monitors the stopper element at a specific position of the processing means, or it monitors the stopper element over a segment of its movement when it travels in the processing means. Consequently, the viewing means first searches for the stopper element, and then monitors it. The processing means and the viewing means will be described in more detail in the description of the other figures.

Downstream from the processing means 4, the stopper elements are picked up, one at a time, by the upward conveyor branch 5 that can ensure the lifting, for example, to feed the work station that is located downstream. This conveyor branch is parallel to the gravity drop 3.

The ejection means is located in the area of the upward conveyor branch 5. This height corresponds at a minimum to the travel of the upward conveyor branch 5 during the period when the monitoring of the stopper element is carried out and the period when the information is transferred to the ejection means 6. The fact of monitoring the stopper elements by at least one viewing means that is located in the processing means, i.e., in the low part of the delivery device 1, makes it possible to place the ejection means at a smaller distance than if the monitoring had been placed also in the upward conveyor branch as could be the case in the state of the art.

Figure 2:
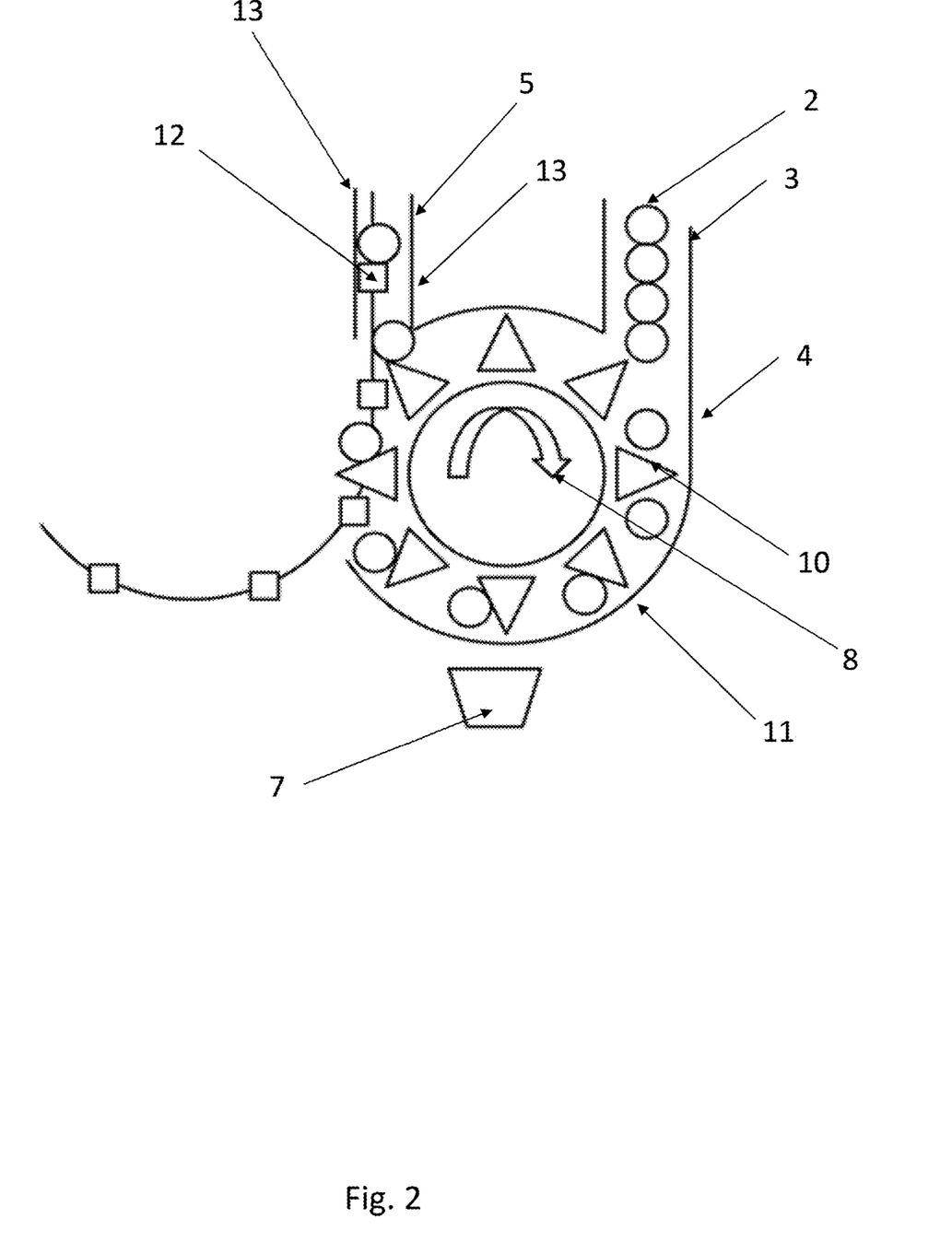
FIG. 2 is a detailed view of a first embodiment of the device for delivery of stopper elements.

FIG. 2 illustrates an embodiment of the device 1 for delivery of stopper elements and more particularly of the processing means 4.

Upstream from the processing means 4, the stopper elements accumulate in the gravity drop 3. This gravity drop consists of a sliding pad that defines a reference plane on which the surfaces of the elements 2 and guides located on both sides of the stopper elements conventionally slide. Opposite the sliding pad, there is located a wall that prevents the elements from jostling. Still in a conventional orientation, the opening of the elements is located opposite to this wall.

Downstream from the gravity drop 3, the stopper elements are picked up by the processing means 4. This processing means comprises a referencing wheel 8 on the periphery of which are located surfaces 10 that are essentially radial and able to convey the stopper elements 2 individually, with an outside guide 11 being located in the extension of one of the guides of the gravity drop 3 and parallel to the referencing wheel 8 so as to retain the elements and to reference them between the surface 10 and the guide 11, as well as a sliding pad that is located in the extension of the pad of the gravity drop 3 that makes it possible for the element to slide at the top as it travels, and a wall being located opposite and parallel to the sliding pad so as to prevent the elements 2 from jostling as they move.

In this embodiment, the referencing wheel 8 conveys the stopper elements clockwise.

In addition, the sliding pad and/or the opposite wall can be transparent.

The surfaces 10 are spaced from one another by a distance that is compatible with the processing that is carried out afterward, i.e., monitoring of the quality of the stopper element, time of ejection of the element, feeding of the downstream work station, such as a sealing device, sterilization station.

As a variant, the surfaces 10 can be in the form of slots that surround the element and that are positioned on the periphery of the referencing wheel.

Furthermore, in the particular case of the stoppers that are equipped with a tamper-proof ring, the guide 11 can have a discontinuity in the area of its surface of contact with the element 2. The contact surface corresponds to the height of the element 2 without a tamper-proof ring. Consequently, when the element 2 does not have a tamper-proof ring, it falls under the action of its weight. Furthermore, this guide 11 can be made of a transparent material.

In the embodiment that is illustrated in FIG. 2, the referencing wheel 8 rotates clockwise in relation to an axis A that is perpendicular to a plane that is defined by the referencing wheel, and this plane is essentially parallel to the plane that is defined by the pad of the gravity drop and the plane that is defined by the sliding pad that is located in the area of the referencing wheel.

Downstream from this referencing wheel, the elements 2 are picked up by an upward conveyor branch 5 that comprises an endless belt in the area of which are located wedges 12 that exert a thrust on the elements to entrain them, a pad on which slide the surfaces of the elements, and a wall opposite to the pad so as to prevent any jostling of the elements, as well as vertical guides 13 that are located on both sides of the wedge 12 that makes it possible to prevent any jostling of the elements.

When rising, the element 2 is referenced between the wedge 12 and at least one of the guides 13, i.e., the element is in contact at the same time with the wedge 12, one of the guides 13, the pad, or the wall that thus define a volume of referencing and stability for the element 2.

The upward conveyor branch 5 has an ejection means 6 that is located in the area of one of the guides 13. This ejection means comprises a compressed air nozzle or a mechanical device such as a cylinder and a recess in the guide 13 that is opposite to the ejection means to let the ejected element pass. The compressed air nozzle or the mechanical device, such as a cylinder, has the function of ejecting the element by exerting a thrust to destabilize it from its referencing volume that is constituted by the wedge 12, one of the guides 13, and the pad or the wall.

This device for delivery of elements comprises at least one viewing means 7 that is located in the area of the processing means 4 and more particularly in the area of the referencing wheel 8. The viewing means is an image acquisition means such as a camera or a photographic device that is coupled to a control unit that monitors the digitization of the element.

This viewing means can operate in various ways: either the viewing means monitors the stopper element at a specific point and therefore at a referenced position in the referencing wheel, or the viewing means monitors the stopper element over a segment of its movement when it travels in the processing means, and in this case, the viewing means first searches for the stopper element on a part of the segment that is defined by the referencing wheel, and then the element is monitored.

Because this device 1 for delivery of elements operates at a high speed, the monitoring is done when the element 2 is referenced at a specific point in the referencing wheel, i.e., when the element is positioned between a surface 10 of the referencing wheel 8 and the guide 11.

In addition, to meet the need for high speed, the triggering of the monitoring is synchronized between the referencing wheel and the triggering of the viewing means 7. In other words, the rotation of the referencing wheel 8 induces the triggering of the viewing means 7.

This synchronization is implemented either by a coder that is coupled to the motor for rotating the referencing wheel 8, or by a sensor that measures the angle of rotation of the reference wheel.

In certain embodiments, the viewing means 7 is equipped with a lens that is placed in the facing position in relation to the area of the processing means 4 and more particularly opposite to the referencing wheel 8. In other words, the lens of the viewing means 7 can be associated with a plane, and this plane is essentially parallel to the plane that is defined by the referencing wheel.

Consequently, the lens of the viewing means can be placed on one side or the other of the referencing wheel so as to be able to monitor the surface or the opening of the element 2 that follows the positioning of the lens. To be able to carry out this type of monitoring, the sliding pad or the wall that is located opposite to the sliding pad is to be made of transparent material.

As a variant, this viewing means 7 has a lens that can be placed facing the side of the referencing wheel 8 so as to be able to monitor the section of the element 2 and, more particularly in the case of stoppers that are equipped with a tamper-proof ring, to verify the presence or absence of this tamper-proof ring. To be able to carry out this type of monitoring, the guide 11 that is peripheral to the referencing wheel is to be made of transparent material.

Furthermore, the conveying of the elements 2 in the referencing wheel generates a rotation of said elements 2 on themselves. This rotation can be employed to be able to monitor the section of the element and, as indicated, with at least two viewing means that can monitor the element at two different locations on the referencing wheel, for example one after the other.

Once the monitoring is carried out, i.e., the orientation of the surface and the opening of the element, the quality of the surface or the opening of the element, its dimensions, the presence or absence of a tamper-proof ring in the area of the stopper, and/or the quality of the edges of a ring, then the element is ejected or not according to one of the criteria provided to the control unit. Consequently, in the case of an ejection, the control unit actuates the ejection means 6 so as to take out only the element that is identified as undesirable, or multiple elements before or behind it.

A synchronization is carried out between the processing means 4, the viewing means 7, and the ejection means 6 to make it possible to eject the one and only element that is monitored as non-compliant by the control unit, and even to eject very few elements, i.e., one or more element(s) before the one that is monitored as non-compliant or one or more element(s) behind the one that is monitored as non-compliant.

Figure 3:
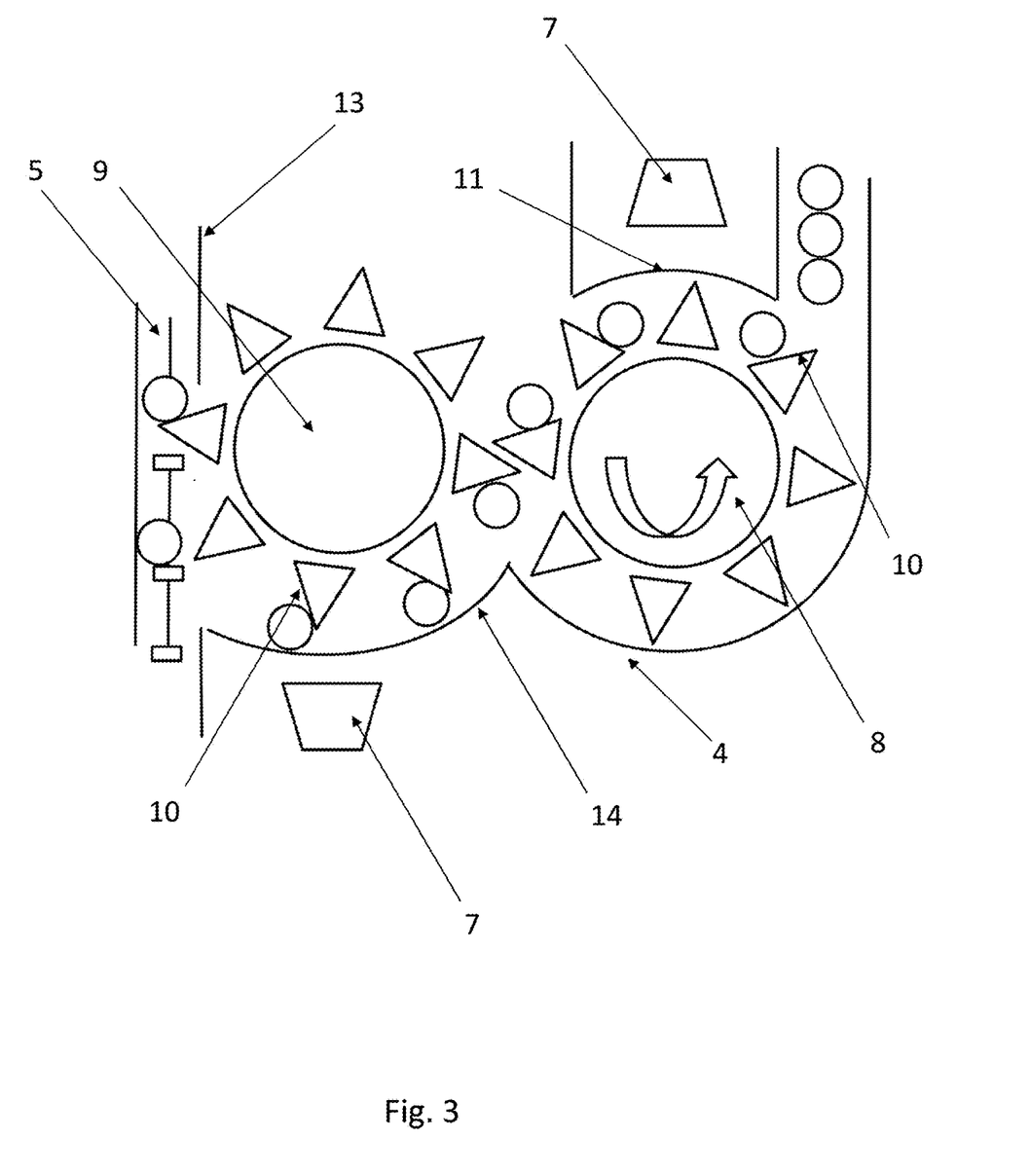
FIG. 3 is a detailed view of a second embodiment of the device for delivery of a stopper element.

FIG. 3 illustrates a second embodiment of the device 1 for delivery of stopper elements and more particularly the processing means 4.

Upstream from the processing means 4, the elements accumulate in the gravity drop 3. This gravity drop consists of a sliding pad that defines a reference plane and on which conventionally slides the surface of the elements 2, guides located on both sides of the stopper elements, and opposite the sliding pad, a wall that prevents the elements from jostling. In a conventional orientation, the opening of the elements is located facing this wall.

Downstream from the gravity drop 3, the stopper elements are picked up one after the other by the processing means 4. This processing means comprises a referencing wheel 8 and a return wheel 9.

The referencing wheel 8 comprises surfaces 10 on its periphery that are essentially radial and able to convey the stopper elements 2 individually. An outside guide 11 is located in the extension of one of the guides of the gravity drop 3 and parallel to the referencing wheel 8 so as to retain the elements, to reference them between the surface 10 and the guide 11. A sliding pad is located in the extension of the pad of the gravity drop 3 that makes it possible for the element to slide at the top as it travels. A wall is located opposite and parallel to the sliding pad so as to prevent the elements 2 from jostling as they move.

The surfaces 10 are spaced from one another by a distance that is compatible with the processing that is carried out afterward, i.e., monitoring of the quality of the stopper elements, feeding of the downstream work station, such as a sealing device, and element-sterilizing station.

In the embodiment that is illustrated in FIG. 3, the referencing wheel 8 rotates counterclockwise in relation to an axis B that is perpendicular to a plane that is defined by the referencing wheel. This plane is essentially parallel to the pad of the gravity drop.

Downstream from this referencing wheel, but still in the processing means 4, the elements 2 are picked up by a return wheel 9. The former rotates clockwise in contrast to the referencing wheel that rotates counterclockwise.

The return wheel 9 has a structure that is similar to the referencing wheel 8, i.e., on its periphery, the return wheel 9 comprises surfaces 10 that are essentially radial and able to convey the stopper elements 2 individually. An outside guide 14 is located parallel to the circumference of the return wheel 9 so as to retain the elements, to reference them between the surface 10 and the guide 14. A sliding pad is located in the extension of the pad of the referencing wheel, making it possible for the element to slide at the top as it travels. A wall is located opposite and parallel to the sliding pad so as to prevent the elements 2 from jostling as they move.

The return wheel in particular has the function of increasing the transport time and therefore the time that is available for monitoring in relation to the solution that is described in the first embodiment.

Downstream from the return wheel 9, the elements are picked up by an upward conveyor branch 5 and therefore lifted. The upward conveyor branch 5 and the ejection means 6 have the same structure as the one described previously for FIG. 2.

Figure 4:
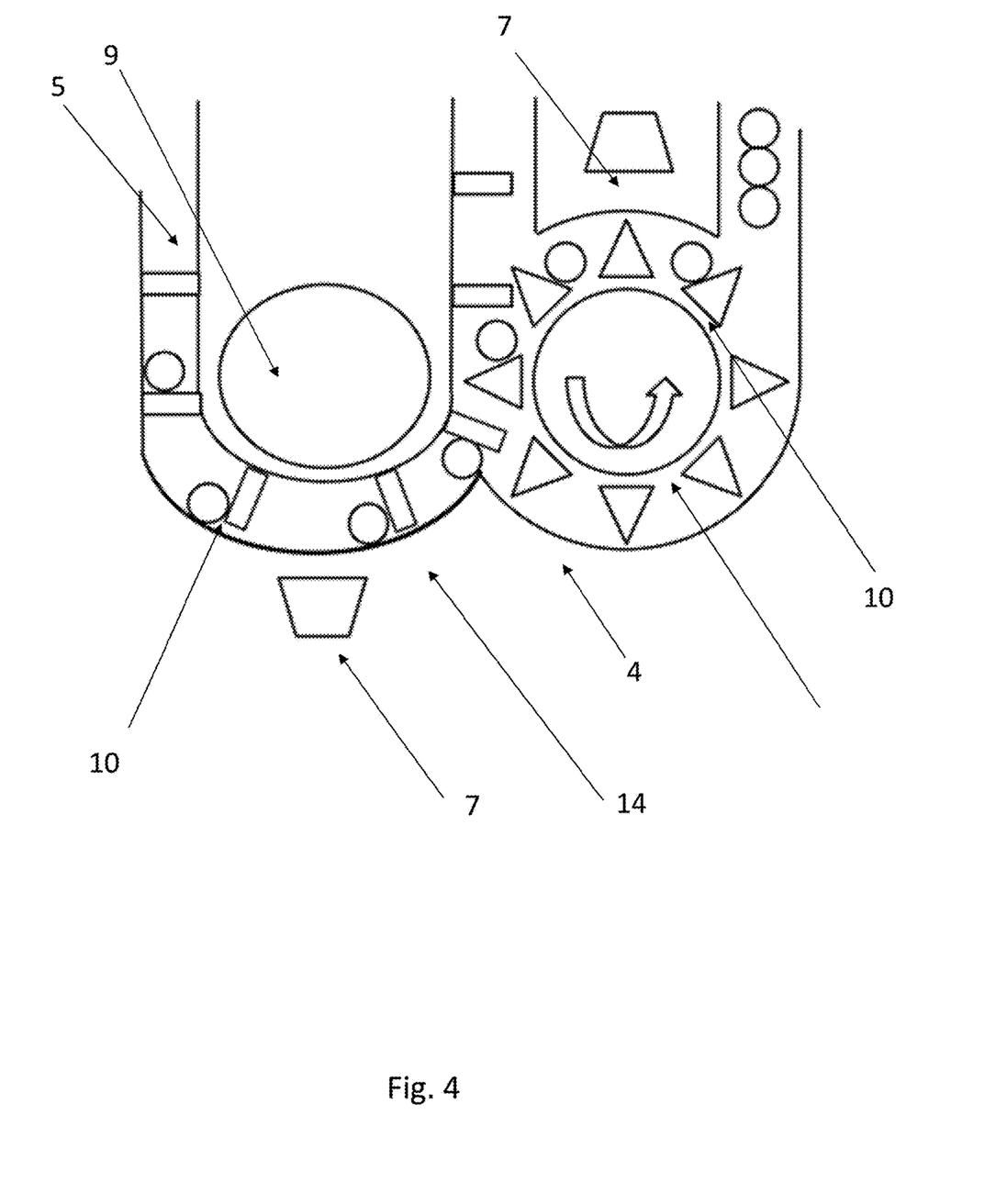
FIG. 4 is a detailed view of a third embodiment of the device for delivery of a stopper element.

FIG. 4 illustrates a third embodiment of the device 1 for delivery of stopper elements and more particularly of the processing means 4.

In this third embodiment, the return wheel 9 can be a wheel that is used to engage a belt that is equipped with wedges between which one element 2 is located each time. These wedges comprise a surface that has the same function as the surface 10 of the embodiment described previously, i.e., said surface can convey the elements 2 individually.

The viewing means can operate in various ways: either the viewing means monitors the stopper element at a precise position of the processing means, or it monitors the stopper element over a segment of its movement when it travels in the processing means. Consequently, the viewing means first searches for the stopper element, and then it monitors it.

To meet the need for high speed, the triggering of the monitoring is synchronized between the referencing wheel and/or the return wheel and the triggering of the viewing means 7. In other words, the rotation of the referencing wheel 8 and/or the return wheel 9 induces the triggering of the viewing means 7.

This synchronization is implemented either by a coder that is coupled to the motor for rotating the referencing wheel 8 and/or the return wheel 9, or by a sensor that measures the angle of rotation of one of the wheels.

The viewing means 7 is equipped with a lens that is placed in the facing position in relation to the area of the processing means 4 and more particularly opposite one of the wheels. In other words, the lens of the viewing means 7 can be associated with a plane, and this plane is essentially parallel to the plane that is defined by one of the wheels, i.e., the referencing wheel and/or the return wheel 9.

Consequently, the lens of the viewing means can be placed on one side or the other of the referencing wheel so as to be able to monitor the surface or the opening of the element 2 according to the positioning of the lens. In other words, the viewing means 7 can be placed in front of or behind the processing means 4. To be able to carry out this type of monitoring, the sliding pad and/or the wall that is located opposite the sliding pad should be made of transparent material.

As a variant, this viewing means 7 has a lens that can be placed facing the side of one of the wheels so as to be able to monitor the section of the element 2 and more particularly, in the case of the stoppers that are equipped with a tamper-proof ring, to verify the presence or absence of this tamper-proof ring. To be able to carry out this type of monitoring, the guide 11 and/or the guide 14 should be made of transparent material.

Furthermore, the conveying of the elements 2 in the wheels 8, 9 generates a rotation of said elements 2 on themselves. This rotation can be employed to be able to inspect the section of the element and, as indicated, with at least two viewing means 6 that can monitor the element at two different locations on the wheels.

Once the monitoring is carried out, i.e., the orientation of the surface and the opening of the element, the quality of the surface or the opening of the element, these dimensions, the presence or absence of the tamper-proof ring in the area of the stopper, and/or the quality of the edges of a ring, then the element is ejected or not according to one of the criteria that are parameterized in the control unit. Consequently, in the case of an ejection, the control unit actuates the ejection means 6 so as to take out only the element that is monitored as undesirable or at least very few elements before or after.

Thanks to the invention, it thus is possible to obtain a delivery device 1 that operates at a very high speed and that is ergonomic for the operator because the viewing means as well as the ejection means are at head height.

In addition, the risk of delivering non-compliant stopper elements is reduced to a minimum.

Although the description above is based on particular embodiments, it is in no way limiting of the scope of the invention, and modifications can be provided, in particular by the substitution of equivalent techniques or by a different combination of all or part of the characteristics that are developed above.

The invention claimed is:

1. Device (1) for delivery of sorted elements (2) for feeding a downstream work station, with said device comprising:
    a vertically downward drop (3) that orientates the elements into a single-line column,
    a processing moans (4) that receives the single-line column of elements from the drop one element at a time,
    an upward conveyor branch (5) that extends from the processing means and that receives the elements (2) therefrom, an ejector (6) comprising an actuator, the ejector (6) being located in the area of the upward conveyor branch, and a viewing means (7) that is positioned to monitor the elements in the area of the processing means (4), wherein the viewing means (7) configured to communicate with a control unit when a fault is detected and the actuator is configured to engage when the fault is detected by the viewing (7).

2. The device according to claim 1, wherein the viewing means (7) is located facing the processing means (4) in such a way as to monitor at least one of the surfaces or the element (2).

3. The device according to claim 1, wherein the viewing means (7) is located on one side of the processing means (4) in such a way as to monitor at least a portion of the element.

4. The device according to claim 1, wherein the operation of the viewing means (7) is synchronized with that of the processing means.

5. The device according to claim 1, wherein the processing means (4) comprises a referencing wheel (8) that delivers the elements one at a time to a return wheel (9), and said referencing wheel (8) and the return wheel (9) are equipped with referencing surfaces (10) that exert a thrust on the element to rein it in and to move it, said return wheel (9) belonging to the processing means 4.

6. The device according to claim 1, wherein the processing means (4) comprises a referencing wheel (8) that delivers the elements to a belt that is mounted on a return wheel (9); said belt and said referencing wheel are equipped with referencing surfaces (10) that exert a thrust on the element to rein it in and to move it, said return wheel (9) belonging to the processing means 4.

7. Method for delivery of sorted elements (2) to feed a downstream work station, with said method comprising:

orienting the elements (2) into a single-line column, using a vertical downward drop, toward a processing means (4), conveying the single-line column of elements through a processing means (4), lifting the elements one at a time in an upward conveyor branch (5), and monitoring the elements by at least one viewing means (7) in the area of the processing means (4), wherein the viewing means (7) is configured to communicate with a control unit when a fault is detected and an actuator of an ejector located in the area of the upward conveyor branch (5) is configured to engage when the fault is detected by the viewing means (7).

8. Method according to claim 7, wherein the step for Monitoring the element is carried out by a viewing means (7) that is synchronized with the movement of a stopper element (2) in the processing means (4).

9. Method according to claim 7, further comprising ejecting the element based on the result of the monitoring step, with said ejection step being implemented in the area of the upward conveyor branch (5).

10. Method according to claim 7, wherein a monitoring step is carded out with the viewing means (7) that is located facing the processing means (4) in such a way as to monitor a surface of a stopper element (2).

11. Method according to claim 7, wherein a monitoring step is carried out with the viewing means (7) that is located on one side of the processing means (4) in such a way as to monitor at least a portion of the element (2).

12. The device of claim 1, wherein the viewing means comprises a camera.

13. The device according to claim 2, wherein the viewing means (7) is located on one side of the processing means (4) in such a way as to monitor at least a portion of the element.

14. The device according to claim 2, wherein the operation of the viewing means (7) is synchronized with that of the processing means.

15. The device according to claim 3, wherein the operation of the viewing means (7) is synchronized with that of the processing means.

16. The device according to claim 2, wherein the processing means (4) comprises a referencing wheel (8) that delivers the elements one at a time to a return wheel (9), and said referencing wheel (8) and the return wheel (9) are equipped with referencing surfaces (10) that exert a thrust on the element to rein it in and to move it.

17. The device according to claim 3, wherein the processing means (4) comprises a referencing wheel (8) that delivers the elements one at a time to a return wheel (9), and said referencing wheel (8) and the return wheel (9) are equipped with referencing surfaces (10) that exert a thrust on the element to rein it in and to move it.

18. The device according to claim 4, wherein the processing means (4) comprises a referencing wheel (8) that delivers the elements one at a time to a return wheel (9), and said referencing wheel (8) and the return wheel (9) are equipped with referencing surfaces (10) that exert a thrust on the element to rein it in and to move it.

19. The device according to claim 2, wherein the processing means (4) comprises a referencing wheel (8) that delivers the elements to a belt that is mounted on a return wheel (9); said belt and said referencing wheel are equipped with referencing surfaces (10) that exert a thrust on the element to rein it in and to move it.

20. The device according to claim 3, wherein the processing means (4) comprises a referencing wheel (8) that delivers the elements to a belt that is mounted on a return wheel (9); said belt and said referencing wheel are equipped with referencing surfaces (10) that exert a thrust on the element to rein it in and to move it.

* * * * *